Figure 1:
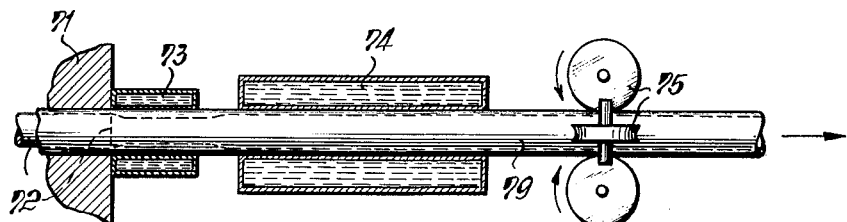

Sept. 14, 1965  R. NIESSNER ETAL  3,205,535
APPARATUS FOR SHAPING THE END OF A TUBE
Filed Feb. 23, 1962  5 Sheets-Sheet 1

United States Patent Office 3,205,535
Patented Sept. 14, 1965

3,205,535
APPARATUS FOR SHAPING THE END OF A TUBE
Rudolf Niessner, Bogen, Max Sonnleitner, Oberaltaich, near Bogen, Karl Hermann Wolf, Regenhutte, near Zwiesel, and Johann Gutlhuber, Irlbach, near Straubing, Germany, assignors to Kunstoffwerk Gebruder Anger G.m.b.H. & Co., Munich, Germany
Filed Feb. 23, 1962, Ser. No. 176,179
Claims priority, application Germany, Feb. 25, 1961, K 43,015; Nov. 22, 1961, K 45,267
8 Claims. (Cl. 18—14)

This invention relates to the production of extruded tubes, with widenings and/or thickenings extending transversely to the direction of discharge of extruded material from the associated extruder. The invention also relates to the finishing of said extruded tubes.

Difficulties arise when connecting tubes, particularly synthetic plastic tubes, because as a rule one end of each tube fitting must be widened or, for example, if a thread has to be made in it, a thickening of the end is necessary. If in the first case the tube is widened out from its normal diameter to the increased diameter of a socket for the next tube, and annular corrugations are furthermore provided in the widened portion to accommodate sealing rings, then the widened portions have a smaller wall thickness than tube portions of normal diameter. This is most disadvantageous, as the portions with the larger diameter of course require an increased wall thickness if they are to be subjected to the same pressure as the unwidened portion of the tube. Attempts have been made to overcome these difficulties by shrinking an annular tube, before the widening, over the corresponding tube end in the manner which is usual in armament production. Such a solution is however very unsatisfactory, as it is expensive and time-consuming in production and furthermore very accurate calculation is required if the stresses arising on the inner and outer tubes are to be uniformly distributed. As a rule, however, tolerances on synthetic plastic tubes are so large that the calculated value can certainly not be maintained.

Attempts have also been made to avoid the difficulty by accepting the thinner wall thickness at the sleeve ends of the tube and reducing the maximum pressure accordingly. This procedure, however, results in a considerable expenditure of material, as the total length of the tube, which is normally five meters or more, is overdimensioned.

The defects of the hitherto conventionally extruded tubes, are obviated in accordance with the invention in an extremely simple and efficient manner, in that the tube string emerging from the extruder is upset at the desired distances while still in the deformable condition, in lengths corresponding to the widenings or thickening, to form a greater wall thickness, and that if required the widening and/or further treatment of the thickening is effected as will be hereinafter described. This enables the existing difficulties to be overcome almost without any addiitonal expenditure, as the upsetting can be effected very simply.

With thermoplastic material the thickening of the tube wall is advantageously effected before the end of complete polymerization.

In extruding tubes the tube string emerging from the extruder is advantageously guided by a cooled calibrating collar, in which the tube string is substantially finally polymerized. In the present invention the upsetting is advantageously effected in this collar. In this case the thickening obtained is on the inside. It may be produced, for example, by the extruder being temporarily stopped and the finished tube string being moved back one piece in the meanwhile. The upsetting can also be effected by the tube string being drawn off by a draw-off device following the extruder, at constant speed, and, for a short time during the emergence of the corresponding string portion from the extruder, the output of the latter being increased. The upsetting is, however, particularly advantageously effected by a periodic reduction of the speed of the draw-off device following the extruder, for the finished tube string.

If the thickening of the hollow tube string is provided outwardly, then this is advantageously upset over a calibrating mandrel and fully polymerized.

During the upsetting in a calibrating collar, an overpressure, produced for example by compressed air being fed thereto, is advantageously maintained inside the tube string, which presses the tube against the calibrating collar. A special device for this is not necessary, because as a rule, the production of a smooth tube string is effected with an interior overpressure prevailing at least in the zone of the calibrating collar.

After the upsetting, the finished tube string can be divided in the vicinity of the thickenings, after which these are widened in known manner to the desired diameter and desired sectional profile.

The process according to which the apparatus invention is utilized is advantageously effected by means of a known device, which comprises in sequence an extruder, possibly a calibrating device, preferably a cooling device such as a water-bath connected thereto, and finally a draw-off device. This draw-off device is provided in accordance with the invention with an automatically acting device which periodically reduces the draw-off speed at the desired distances so that in the calibrating device during the period of reduced speed, a thickening of the tube string takes place. Said automatically acting device may be a mechanical one, as it is e.g. provided with automatic lathes, particularly multi spindle automatics, or an electrical control circuit. Such devices are known to one skilled in the art. They are described for example in "Dubbels Taschenbuch für den Maschinenbau," vol. 2, page 627 (edited by Dr. ing. F. Sass and Dipl. Ing. Ch. Bouché, Springer Verlag, Berlin, Göttingen and Heidelberg, 1958). The reduction of the draw-off speed may also be manually controlled; however, an automatic control device is preferable.

The calibrating device may advantageously be a water-cooled collar surrounding the tube string emerging from the extruder.

Advantageously, a pipe for a pressure gas, preferably air, is provided, through which an overpressure is produced inside the portion of the tube string located within the collar, pressing this against the collar.

In the case of synthetic plastic tubes, increases in the internal diameter are also necessary when the tubes are to be joined together by means of spigot and socket arrangements, in which case one tube end is widened out to form a socket in which the unwidened end of another tube is inserted. The socket must then be provided with a corrugation which accommodates a sealing ring.

In this case the widenings have hitherto been produced by introducing the temporarily softened tube end into an outer female die determining the external form of the widening and a pressure medium, air for example, being introduced into the tube end, by which pressure medium the softened tube wall is flexibly adapted to the inner surface of the die. Certainly in this way the outer form is very accurately determined, but not the inner form, which depends on the plastic flow behavior of the tube material. However, it is important to maintain accurately the inner shape of the widenings, as the sealing of the male tube end in the socket depends decisively on the socket diameter and corrugation diameter and shape being accurately maintained. Furthermore, it is essential that the wall thickness of the corrugation in the tube does not decrease too much in relation to the other tube wall thickness.

One object of the invention is therefore to make it possible to produce widenings, of the kind mentioned above, at tube ends with the utmost precision of dimension of the inner surfaces of the widened zone, particularly in connection with the aforesaid tube connections. This and other problems are solved by the tube end being drawn in plastic condition on a core which is variable in form and has the desired internal form of the widenings, the tube end being fixed over this, after which the core is removed from the tube end, a deformation of the core taking place, in particular a collapsing. Obviously, in accordance with the principle of relativity in mechanics, the core may just as well be inserted in the tube end, or both parts can be simultaneously moved one upon the other. Corresponding tests have shown that it is surprisingly possible to push the tube end, rendered plastic, over the widened core, substantially without any jamming, while the tube end again tapers behind the portion of the core again tapering towards the tube end. There is substantially no upsetting of the plastic tube end. The very slight upsetting, which may occur under certain circumstances, may even be desirable, as by this the thinning of the wall, which occurs as the diameter of the tube end increases, is partially or wholly compensated.

The invention is advantageously carried out in such a way that the widening zones of the tube tapering towards the tube end, are flexibly adapted to the core and/or are calibrated, by means of an outwardly engaging device. In this way it is further possible to make any desired correction to the wall thickness. Furthermore, the end face of the tube can be conjointly formed, so that it lies accurately in a plane normal to the axis of the tube. It may be given any desired profile and, for example, may be rounded.

The tube end is advantageously pushed onto the core with the use of a lubricant such as, preferably, oil.

The core is advantageously heated before the tube end is pushed on, in order to prevent any premature solidification of the tube end.

The invention makes it possible to produce connecting sockets for tube ends with a degree of accuracy in measurement and shape not hitherto known.

The invention also contemplates the provision of a device for carrying out the widening operation. This device is characterized by the inclusion of a holding device for the tube to be worked, a variable-form core arranged axially in front of the center of this holding device, a device for axial displacement of the core and also a device to bring the core to a shape in which it can be drawn from the formed tube end.

There is advantageously provided, for exterior calibration and/or flexible adaptation of the tube end to the core, a cylinder which is axially movable over the tube end and is given a profile corresponding to it.

Advantageously hydraulic moving devices are provided for the tube holding device, the profiled cylinder and the deforming of the core.

The core advantageously comprises, at least in the zone of the widening or widenings narrowing towards the tube end, a multiplicity of segments, which are axially and radially movable in relation to one another. The segments advantageously consist of two groups of segments, which intermesh in the manner of gear teeth, in which connection, viewed in a plane normal to the axis of the core, the segments of one group taper towards the axis, while those of the other group remain uniform at least from the exterior to the interior and preferably in width.

There is advantageously mounted on a rod which can be introduced in the tube and carries the core, a thickening possibly conforming with the tube widening, on which thickening the segments tapering towards the axis are arranged with their ends turned away from the tube end movable in radial planes of the axis, preferably swivelably articulated.

The segments not narrowing in width towards the axis are advantageously arranged on a core member conjointly forming, if necessary, the tube widenings, and are displaceable axially to the thickening, and movable in radial planes, preferably swivelably by being articulated.

Stops are advantageously provided preferably at the thickening and the core member which restrict the mobility of the segments outwards.

There is advantageously provided inside the core, and preferably displacably on the rod, an axially displaceable segment control and holding member. In the moved-in position in the core, the control and holding member presses, by corresponding surfaces, the segments into their radially extreme position, while in the moved-out position, it leaves the segments free for inward movements.

The control and holding member is advantageously provided with stops, which swivel the segments at the core member inwards during the outward travel of the core.

The control and holding member is advantageously provided with stops, preferably engaging the segments of the core member, which stops entrain the core member during outward travel.

A member, preferably a bar arranged in the rod, is advantageously provided co-axially with the rod, for moving the control and holding member.

The bar is advantageously connected with the control and holding member by means of fingers engaging through recesses of the rod.

The said thickening is advantageously a body widening the tube to form the socket, which is externally complemented by the segments sitting on it, while the totality of the segments have an annular beading extending over their periphery, which produces a peripheral corrugation in the sleeve.

The profiled cylinder is advantageously displaceable axially on the rod.

A cooling device for the widened tube end, preferably a trickle device, is advantageously provided surrounding the core at a distance from it.

A heating device for heating the synthetic plastic material to the softening temperature is advantageously provided.

Figure 2:
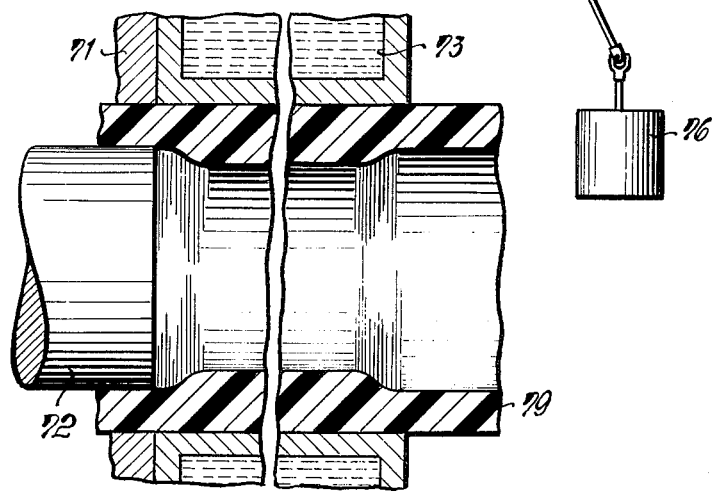
Figure 3:
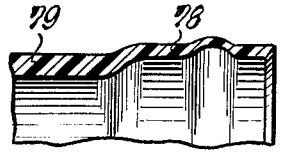
Figure 4:
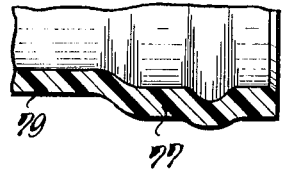
Figure 5:
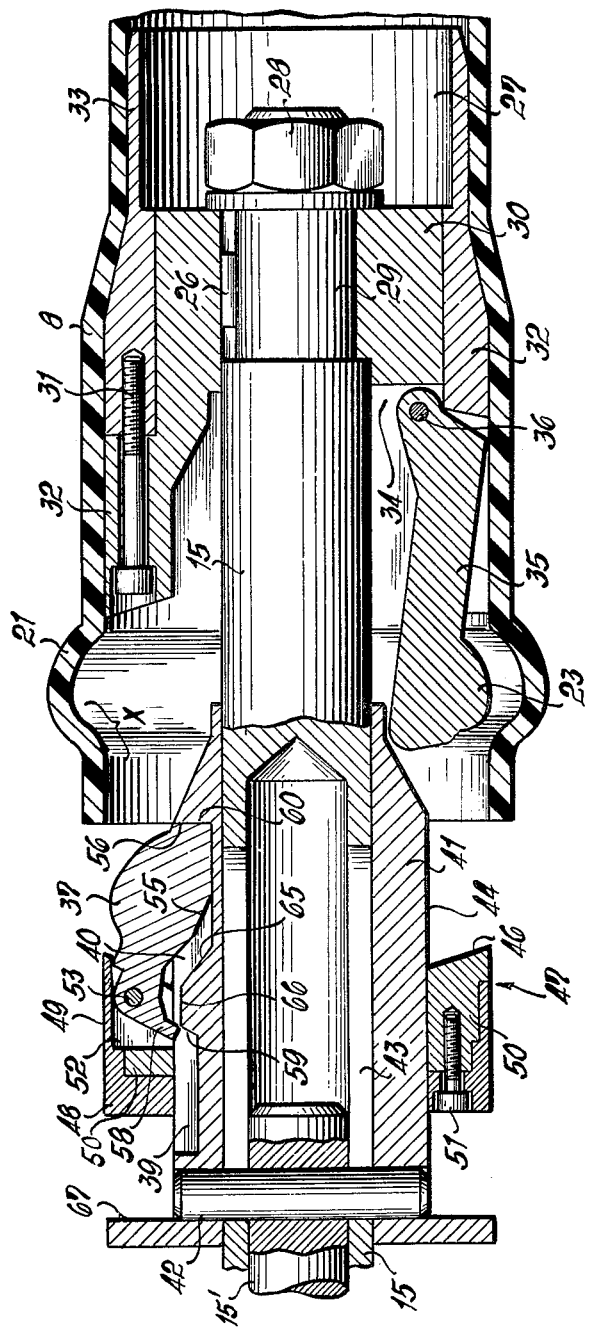
Figure 6:
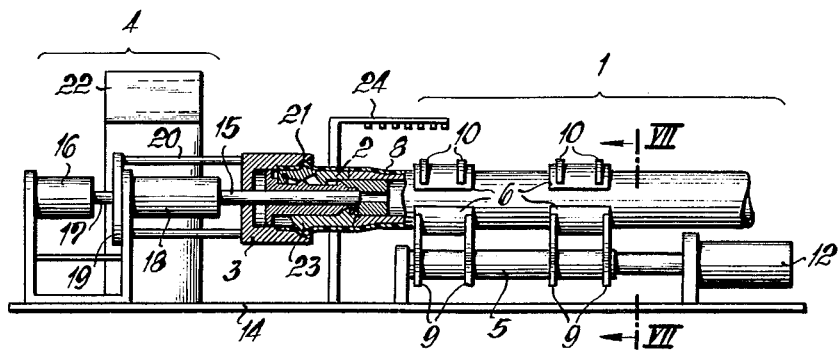
Figure 7:
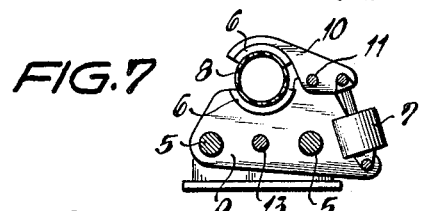
Figure 8:
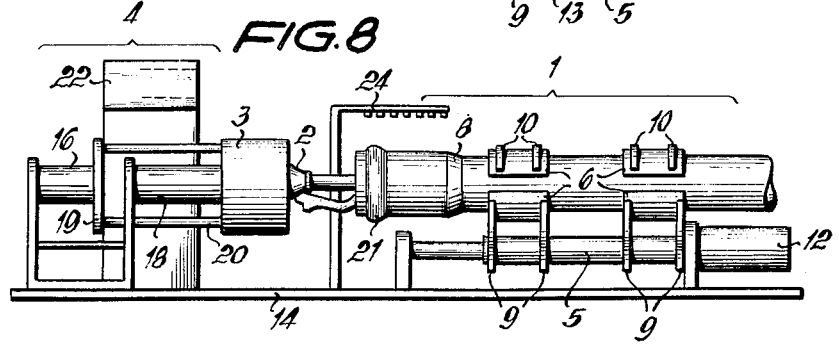
Figure 9:
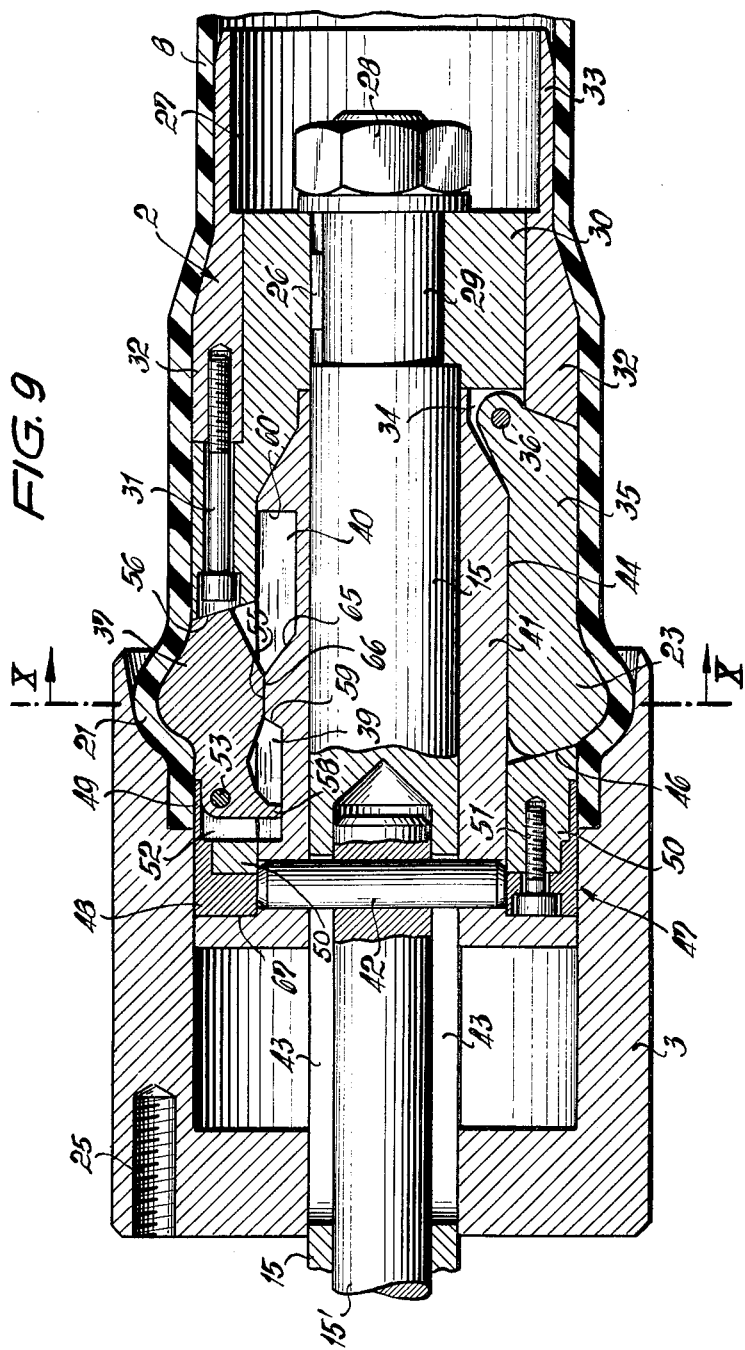
Figure 10:
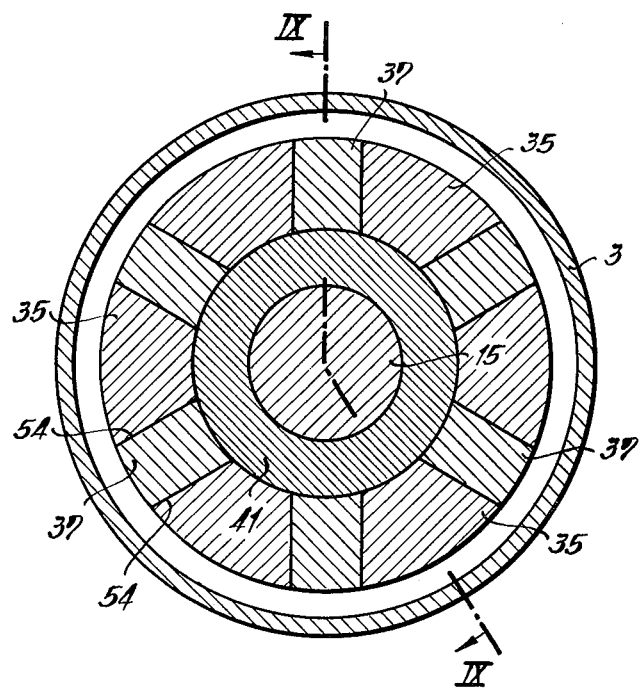

Specific embodiments of the invention will now be described by way of example with reference to the accompanying diagrammatic drawings, in which:

FIGURE 1 illustrates the upsetting of a tube string,

FIGURE 2 shows on a larger scale the portion of the tube string located in the calibrating collar during the thickening process, FIGURES 3 and 4 are exaggerated representations, showing in the upper half (FIG. 3) the socket end of a synthetic plastic tube as known in the art, and in the lower half (FIG. 7) a socket end produced in accordance with the present invention, FIGURE 5 shows a section similar to FIGURE 9, but with the core collapsed so that the tube end can be withdrawn from the core, FIGURE 6 shows a device, partly in section, in accordance with the invention for widening tube ends, after the widening of the tube end and before the disengagement of the core and tube end, FIGURE 7 shows a section on line VII—VII in FIGURE 6, FIGURE 8 shows the device of FIGURE 6 after the disengagement of the core and tube end, FIGURE 9 shows on enlarged scale a longitudinal section through the core of the device shown in FIGURES 6 to 8, located in the finished widened tube end, in which connection the calibrating and flexible adaptation cylinder is still mounted over the tube end, this section corresponding to section line IV—IV of FIGURE 10, and FIGURE 10 shows a section taken on line X—X in FIGURE 9.

There will now be described in connection with FIGURES 1 to 3, the first step of the production of synthetic plastic tubes with ends widened to form a socket, the tube wall being thickened before the widening.

In FIGURE 1 is diagrammatically represented the end face of an extruder 71 having an aperture in which there is located a core 72 so that out of the aperture there is pressed a round synthetic plastic tube 79 consisting of, for example, polyvinyl chloride. The wall thickness of the tube 79 is determined by the difference in diameter between the extruder aperture and the core 72. To the extruder is connected a hollow calibrating collar 73, in which cool water circulates.

At a distance from the calibrating collar 73 is provided a cooling water bath 74 which cools the finished tube emerging from the calibrating collar 73 so that this tube can be gripped, without being damaged, by a draw-off device which operates at the same speed as that at which the tube is pressed out of the extruder. The draw-off device consists, in the embodiment shown, of radially spaced rollers 75, which advance the tube. According to the invention there is provided a conventional drive 76, for the draw-off device, including an automatic control device of conventional type, which decreases the speed of the draw-off intermittently.

At predetermined times, the draw-off speed is reduced by the control device by a given percentage such as, for example 20%. However, the quantity of the synthetic plastic material emerging from the extruder is not decreased and thereby during operation at reduced drawn-off speed there is produced, by the heaping up of material (upsetting) directly following the discharge aperture of the extruder, a tubular section with a correspondingly increased wall thickness, as is more clearly shown in FIGURE 2. If the draw-off device now begins to run at normal speed again, there then follows, adjacent the tubular section with increased wall thickness, a tube portion of normal wall thickness.

In the vicinity of the calibrating collar 73, there may be provided a device which, for example by means of compressed air fed through the core 72, maintains an overpressure inside the tube string produced.

To show an example of the above method of operation, the following data is given.

A tube of polyvinyl chloride with an external diameter of 100 millimeters (mm.) and an internal diameter of 80 mm. is to be extruded. The polyvinyl chloride has a tensile strength of 5 to 5.5 kilogram per square millimeter. The wall thickness of the tube, normally 10 mm. shall after 6 meters be increased to 20 mm. for a length of 0.5 meters. The thickening of the wall shall be on the inside of the tube wall. The extrusion speed and the draw-off speed are 1.5 meters per minute during the extrusion of the normal tube length. The extruder aperture is the usual one for extruding tubes of the above mentioned dimensions. The temperature at the extruding aperture is also usual, preferably being between 120 and 140° C. After the extruding of 6 meters of tube length, the draw-off speed of the draw-off device is reduced to 0.844 meters per minute without changing the extrusion speed. Now the extruder will deliver a portion of tube string with an external diameter of still 100 mm. The internal diameter of this portion however will be 60 mm. After extrusion of a length of 0.5 meters of a so walled tube the draw-off speed again is increased to 1.5 meters per minute. Now the thickly walled part of the tube string will again be followed by a normally walled part and so on.

Generally is to be mentioned, that the relation between the cross-section areas and the draw-off speeds is given by the formula:

$$\frac{v_1}{v_2} = \frac{a_2}{a_1}$$

In this formula $v$ is the draw-off speed and $a$ the cross-section area.

It is of importance in the process in accordance with the invention that in treating the synthetic plastic material the production of the zone of increased wall thickness be effected before the synthetic plastic material, for example polyvinyl chloride, polyethylene or other thermoplastic material, has been completely polymerized. If the upsetting is effected after final polymerization with a renewed heating of the corresponding tube portion, this has the disadvantage that, with the subsequent heating, the upset portion has a tendency to assume again the shape which it had before the upsetting.

The tube string produced in the manner described above is now cut into individual tube components each having a thickening at the end. The upset ends are then brought into a female die, heat being applied, if for example they are to be widened to socket ends of increased diameter, in which female die they are widened in known manner to the desired diameter and the desired form. In this way there can be produced widened socket ends into which tube ends of normal diameter can be inserted. In the course of the widening process there may be produced during the same operational sequence an annular groove in the socket end, which groove accommodates a sealing ring. A socket end 77 thus produced is represented in FIGURE 4, while its upper half shows a similar socket end 78 of known type.

In a similar way the tube end can also be widened for example in a female die provided with a female thread, so that the tube end has a reinforced end with a male thread. The dimensions given to the upset portion and the die must be such that after the working in the die the bore of the tube in the vicinity of the thickened end is substantially equal to the normal diameter of the tube.

In a similar way it is also possible to thread a widened tube end by inserting it in an inner male die.

The upsetting process described is particularly suitable for working synthetic plastic material like polyvinylchloride or polyethylene.

The widening of a tube end for an insert socket will now be described with reference to FIGURES 6 to 10.

In FIGURES 6 to 8 is shown a holding device 1 for a tube to be widened at its end, and also a core 2, a calibrating and flexible-adaptation cylinder 3 and a movement device 4 for the core and the cylinder.

The holding device comprises chucking jaws 6, axially movable and supported on rods 5, which chucking jaws can grip the tube 8 under the control of a hydraulically actuated chucking cylinder 7. The two chucking jaws 6 are supported by plates 9 and 10, which are pivoted on the spindle 11. For axial displacement of the chucking jaws and the tube held thereby, there is provided a hydraulic cylinder 12 which engages the plates 9 of the chucking jaws by means of rod 13.

A rod 15 fixed to the device frame 14 carries the core 2. For collapsing the core 2 there is used a hydraulic cylinder 18, which by means of a bar guided inside the rod 15, collapses the core, in a manner which will be hereinafter described, to such an extent that the widened tube end can be drawn off the core. The calibrating and flexible adaptation cylinder 3 is guided on the rod 15 and is moved axially by the hydraulic cylinder 16. For this purpose there is mounted on the thrust rod 17 of the hydraulic cylinder 16 a disc 19, which engages via two rods 20 with the calibrating and flexible adaptation cylinder 3.

In the embodiment shown, the tube end is to be widened to form a socket which has an annular corrugation 21 (FIG. 11). For this purpose the device is first brought into a position in which the core 2 is closed, while the cylinder 3 however has travelled to the left into the position shown in FIGURE 8. The tube 8 to be widened is chucked in the chucking device after its end is first heated by the heating device 22, which has been only indicated diagrammatically, to the thermoplastic softening temperature of the tube 8. The core is previously externally lubricated with a lubricant, for example oil. The tube is now moved on the core, the end of the tube, whose wall thickness has already been thickened, being pushed over the core. As the plastic material of the tube end has a certain amount of elasticity, it passes over the annular beading 23 of the core and flexibly adapts itself to the core 2, narrowing to the left of the annular beading. The cylinder 3 is now moved onto the tube end in such a way that it fits with its correspondingly formed inner surface into the portion of the tube located to the left of the corrugation 21 produced in the tube end, and flexibly adapts itself to the core. This flexible adaptation primarily insures that the zone of the internal surface of the socket, indicated in FIGURE 11 by $x$, is itself in a markedly curved form, accurately and flexibly adapted to the core.

When the tube end has received the desired widening and profiling operation, then by means of the diagrammatically indicated cooling device 24 (FIG. 8) consisting of a trickle installation, the portion of the formed tube end not covered by the cylinder 3 is sprayed and further solidified by the resulting cooling. Then the cylinder 3 is moved to the left and the part of the tube end hitherto covered by the cylinder is likewise solidified by the spraying. Finally, by means of the hydraulic cylinder 18 the core is collapsed in a manner hereinafter described so that the tube can be drawn from the core by means of the hydraulic cylinder 12. Then the next tube end can be widened and profiled in the same manner.

In the following, the construction and mode of operation of the core will be described in connection with FIGURES 9 to 11.

In FIGURE 9 is shown the cylinder 3, in order that its interior may be better understood. It is provided with threaded holes 25, in which the rods 20 are engaged.

The core, as already explained above, is carried by the rod 15. At the end of the rod 15, a core thickening 27 is fixed and secured against rotation by means of a key 26. This core thickening is held by a nut 28 on a tapered portion 29 of the rod 15. The thickening 27 consists of a base body 30, on which a collar 32 is fixed by means of screws 31. The collar 32 projects with its annular collar 33, surrounding the nut 28, into the zone of the tube 8 which is not to be widened, collar 33 serving for guide purposes. The tube 8 is shown in FIGURES 9 to 11 in the finished widened condition. The base body 30 has on its periphery, regularly distributed at a distance apart from one another, six release or tripping devices 34 (FIGURE 10) in which segments 35 are supported so as to be able to swivel around spindles 36. These segments 35 have, as can be seen in FIGURE 10, wedge-shaped profiles in planes normal to the axis of the cores. In particular they only have this profile in the zone in which they come into contact with the segments 37. In their portion further to the right in FIGURES 9 and 10 for production reasons they have rectangular profiles, which facilitates their bearing on the release devices 34 of the base body 30.

A control and holding cylinder 41 provided with release devices 39 and 40 associated with each of the six segments 37 is supported axially displaceably on the rod 15 by means of the bar 16. The connection of the bar 16 with the control and holding cylinder 41 is effected by means of a pin 42 which projects through elongated slots 43 in the rod 15. By means of its surfaces 44, the cylinder 41 holds the segments 35 in their extreme position shown in FIGURES 9 and 10. This position is outwardly restricted by the stop surfaces 46 of an annular core member 47, which is applied against the corresponding surfaces of the segments 35 as the core moves together. The core member 47 consists of an annular body 48, which partly projects by an outer collar 49 in relation to a second annular body 50 likewise associated with the core member. The annular bodies 48 and 50 are connected by screws 51. The annular body 50 has six release devices 52. In each of these release devices a segment 37 is supported so as to swivel around the spindle 53. The segment 37, as can be seen in FIGURE 9, has lateral surfaces 54 extending parallel to one another, so that they can still be swiveled inwards while they are between the segments 35. Their extreme position is determined by the application of their surfaces 35 to the corresponding surfaces of the control and holding member and also by application of their surfaces 56 to corresponding surfaces of the base body 30. The segments 37 are provided with fingers 58, which can cooperate with corresponding surfaces 59 of the release devices 39 of the control and holding cylinder 41.

There will now be described the movement of the core between the position shown in FIGURE 9 and the position shown in FIGURE 11. For this purpose the bar 16 and the control and holding cylinder 41 connected with it are moved to the left, as far as is permitted by the axial slots 43 in the rod 15. With this movement the surface 59 first abuts against the finger 58 of the segment 37 and swings this finger inwards into the position shown in FIGURE 11. As the member 41 slides to the left the surfaces of the segments 37 cooperating with the surfaces 56 finally come into engagement with the surfaces 60 of the release devices 40 in the position shown in FIGURE 11. Then the member 41 also entrains, by engaging against the segments 37, the core member 47 which is supported so as to be able to move freely and axially on the periphery of the control and holding cylinder 41. The segments 37 swiveled inwards, as described above, no longer project into corrugation 21 so that they can be withdrawn from the tube end. With the travel to the left of the control and holding cylinder 41 the swiveling inwards has uncovered its surface 44 to free the segments 35, so that these, when the tube is withdrawn from the core, can be swiveled inwardly under the influence of the tube wall, into the position shown in FIGURE 10, as the tube is withdrawn.

After the tube is drawn off, the control and holding member 41 is again moved, by means of the bar 16, to the right whereby it moves the segments 35 back again to their outward positions. With further displacement of the member 41 towards the right, the surfaces 65 of the release devices 40 pivot the segments 37 such that surfaces 55 slide on the surfaces 66. Since the control and holding member, when the core sections have moved together, presses with ring 67 against the annular body 48, the whole core is firmly held together.

Attention is invited to the fact that elements 35 and 37 cooperatively constitute a male die having a continuous surface. This male die is, further, collapsible. This feature is advantageously effected by interdigitating elements 35 and 37 and pivoting them on different pivots while providing the elements 35 with a wedge-shaped cross-section and the elements 37 with a rectangular cross-section. As a result, it is possible firstly to withdraw elements 37 from between the elements 35 after which the latter can be collapsed.

It should be noted in further accordance with the invention that the core can be heated before the application of the tube end, in order to prevent a premature setting of the latter.

The invention is not restricted to the examples described, but is in fact susceptible of variation within the scope of the following claims.

What is claimed is:

1. Apparatus for processing a settable material comprising extrusion means including a core for extruding material to the form of a hollow tube; means for urging said material through said extrusion means at a determinable speed; treating means adjacent said extrusion means to cause material emerging from the latter to set at least in part; drawing means to engage the material treated by said treating means and to convey the material away from said extrusion means at a speed having a determinable relationship to said determinable speed; control means to regularly and periodically vary said relationship whereby an accumulation of said material is effected in successive portions of the extruded hollow tube, said extrusion means comprising means engaging the hollow tube thus formed along the outer surface thereof to form the tube with a constant outer diameter such that the accumulation of material is formed along the inner surface of the tube at regular intervals along said tubes; means for severing the tube at the locations therein whereat there is an accumulation of material to thereby form a plurality of tubular units having a uniform outer diameter and at least one end with an increased thickness; means for receiving the units one by one; and means related to the extrusion means for deforming the units at the ends of increased thickness in relation to the magnitude of said increased thickness to produce units each with widened ends having substantially the same thickness as the remainder of the unit, said means for deforming the units comprising a plurality of angular spaced first core sections distributed about a determinable axis, means supporting said sections for movement in respective radial planes related to said axis, said core sections being of wedge-shaped cross-section, a plurality of second core sections distributed about said axis, means supporting the second core sections for movement in radial planes related to said axis, said second core sections being positioned for interdigitation with the first core sections to constitute a core, means for radially displacing the second core sections into and out of positions for engaging with the first core sections, and means to move the core sections relatively along said axis into and out of engagement with each other.

2. Apparatus for shaping the end of a tube comprising a plurality of angularly spaced first core sections distributed about a determinable axis, means supporting said sections for movement in respective radial planes related to said axis, said core sections being of wedge-shaped cross-section, a plurality of second core sections distributed about said axis, means supporting the second core sections for movement in radial planes related to said axis, said second core sections being positioned for interdigitation with the first core sections to constitute a core, means for radially displacing the second core sections into and out of positions for engaging with the first core sections, and means to move the core sections relatively along said axis into and out of engagement with each other.

3. Apparatus for shaping the end of a tube comprising a plurality of angularly spaced first core sections distributed about a determinable axis, means pivotally supporting said sections for movement in respective radial planes related to said axis, said first core sections being of wedge-shaped cross-section, a plurality of second core sections, means pivotally supporting the latter for movement in radial planes related to said axis, said second core sections having a quadrilateral cross-section and being positioned for interdigitation with the first core sections to constitute a core, means for pivoting the second core sections into and out of positions for engaging the first core sections, further means to move the second core sections into and out of engagement with the first core sections, means for encircling said core and forming a die therewith, means for engaging said tube and positioning the same for engagement by said die, means operatively positioned to heat said tube prior to the engagement thereof, and means to cool the tube after the deforming thereof.

4. Apparatus for shaping the end of a tube comprising a first member constituting a guide for said tube, a device defining an axis and axially displaceable toward and away from said first member, a group of angularly spaced first core sections circularly distributed about said axis and pivoted to said first member for movement in respective radial planes related to said axis, said core sections constituting part of a core adapted for shaping said tube, a second member axially displaceable with respect to said device, a group of second core sections pivoted on said second member for movement in radial planes related to said axis, said second core sections being positioned for interdigitation with the latter to complete said core, means on said device for engaging the second core sections and pivoting the same into and out of positions for engaging with the first core sections, and means to move the first and second core sections into and out of engagement, said groups of sections respectively having wedge-shaped and substantially rectangular cross-sections in a determinable plane perpendicular to said axis.

5. Apparatus comprising a rod, a first member fixed on said rod and constituting a guide for a tube, a device axially displaceable on said rod toward and away from said first member, a bar connected to said device whereby the latter may be controlled, a plurality of spaced first core sections peripherally distributed about said rod and pivoted to said first member for movement in respective radial planes related to said rod, said first core sections being of wedge-shaped cross-section, a second member axially displaceable on said device, a plurality of second core sections pivoted on said second member for movement in radial planes related to said rod, said second core sections being of rectangular cross-section and being positioned for interdigitation with the first core sections to constitute a core, means for engaging the second core sections and pivoting the same into and out of positions for engaging with the first core sections, and means on said device to engage the second core sections upon movement of said device axially with respect to said rod to move the second core sections into and out of engagement with the first core sections.

6. Apparatus comprising an elongated rod having a slot therein, a member fixed on an end of said rod and adapted for constituting a guide for a tube, a cylinder axially displaceable on said rod toward and away from said member, a bar axially displaceable within said rod, a pin extending through said slot and connecting said bar and cylinder whereby the latter may be controlled, a plurality of spaced first core sections peripherally distributed about said rod and pivoted to said member for movement in respective radial planes related to said rod, said core sections having outer surfaces adapted to deform said tube and being of wedge-shaped cross-section adjacent said surfaces, a second member axially displaceable on said cylinder, a plurality of second core sections pivoted on said second member for movement in radial planes related to said rod, said second core sections including outer surfaces corresponding to the first said surfaces and being positioned for interdigitation with the first core sections to constitute a core, means on said cylinder for engaging the second core sections and pivoting the same into and out of positions for engaging with the first core sections, and further means on said cylinder to engage the second core sections upon movement of said cylinder axially with respect to said rod to move the second core sections into and out of engagement with the first core sections.

7. Apparatus for forming the end of a tube comprising an elongated rod having a diametral slot therein, a first annular member fixed on an end of said rod and constituting a guide for said tube, a cylinder axially displaceable on said rod into and away from abutting relationship with said annular member, a bar axially displaceable within said rod, a pin extending through said slot and connecting said bar and cylinder whereby the latter may be controlled, a plurality of angularly spaced first core sections peripherally distributed about said rod and pivoted to said annular member for movement in respective radial planes related to said rod, said core sections including bulbous outer portions adapted to deform said tube and being of wedge-shaped cross-section adjacent said portions, a second annular member axially displaceable on said cylinder, a plurality of second core sections pivoted on said second annular member for movement in radial planes related to said rod, said second core sections including bulbous outer portions corresponding to the first said bulbous portions and being positioned for interdigitation with the latter to constitute a core, means on said cylinder for engaging the second core sections and pivoting the same into and out of positions for engaging with the first core sections, further means on said cylinder to engage the second core sections upon movement of said cylinder axially with respect to said rod to move the second core sections into and out of engagement with the first core sections, and means for encircling said core and forming a die therewith.

8. Apparatus for deforming the end of a tube comprising an elongated rod having a diametral slot therein, a first annular member fixed on an end of said rod and constituting a guide for said tube, a cylinder axially displaceable on said rod into and away from abutting relationship with said annular member, a bar axially displaceable within said rod, a pin extending through said slot and connecting said bar and cylinder whereby the latter may be controlled, a plurality of angularly spaced first core sections peripherally distributed about said rod and pivoted to said annular member for movement in respective radial planes related to said rod, said core sections including bulbous outer portions adapted to deform said tube and being of wedge-shaped cross-section adjacent said portions, a second annular member axially displaceable on said cylinder, a plurality of second core sections pivoted on said second annular member for movement in radial planes related to said rod, said second core sections including bulbous outer portions corresponding to the first said bulbous portions and being positioned for interdigitation with the latter to constitute a core, means on said cylinder for engaging the second core sections and pivoting the same into and out of positions for engaging with the first core sections, further means on said cylinder to engage the second core sections upon movement of said cylinder axially with respect to said rod to move the second core sections into and out of engagement with the first core sections, means for encircling said core and forming a die therewith, means for engaging said tube and positioning the same for engagement by said die, means operatively positioned to heat said tube prior to the engagement thereof, and means to cool the tube after the deforming thereof.

References Cited by the Examiner

UNITED STATES PATENTS

| | | | |
|---|---|---|---|
| Re. 25,570 | 5/64 | Lemelson | 18—12 |
| 729,099 | 5/03 | Smith. | |
| 2,361,933 | 11/44 | Ferla. | |
| 2,512,844 | 6/50 | Weber | 18—14 |
| 2,616,128 | 11/52 | Barry et al. | 18—14 |
| 2,791,806 | 5/57 | Tordella | 18—55 |
| 2,799,046 | 7/57 | Rossini | 18—12 |
| 2,826,784 | 3/58 | Pratt | 18—19 |
| 2,870,486 | 1/59 | Wagner et al. | 18—55 |
| 2,945,258 | 7/60 | Houston | 18—14 |
| 2,948,919 | 8/60 | Matthews | 18—14 |
| 2,974,367 | 3/61 | Doering et al. | 18—19 |
| 3,015,129 | 1/62 | Hays et al. | 18—12 |
| 3,019,481 | 2/62 | Negoro | 18—14 |
| 3,031,365 | 4/62 | Marchioli et al. | 25—39 X |

FOREIGN PATENTS

| | | |
|---|---|---|
| 798,692 | 7/58 | Great Britain. |
| 563,423 | 5/57 | Italy. |

J. SPENCER OVERHOLSER, *Primary Examiner.*

MORRIS LEIBMAN, MICHAEL V. BRINDISI, WILLIAM J. STEPHENSON, *Examiners.*